United States Patent [19]

Sakamoto

[11] Patent Number: 5,389,745
[45] Date of Patent: Feb. 14, 1995

[54] HANDWRITING INPUT APPARATUS FOR INPUTTING HANDWRITTEN DATA FROM UNSPECIFIED DIRECTION

[75] Inventor: Hiroyuki Sakamoto, Tokyo, Japan

[73] Assignee: Kabushiki Kaisha Toshiba, Kawasaki, Japan

[21] Appl. No.: 942,842

[22] Filed: Sep. 10, 1992

[30] Foreign Application Priority Data

Sep. 11, 1991 [JP] Japan .................. 3-231241

[51] Int. Cl.[6] .................. G08C 21/00; G09G 5/38; G06K 9/00
[52] U.S. Cl. .................. 178/18; 345/179; 382/13
[58] Field of Search .................. 382/3, 44–47, 382/13; 178/185, 20, 19; 340/712; 345/179, 126

[56] References Cited

U.S. PATENT DOCUMENTS

| | | | |
|---|---|---|---|
| 4,933,514 | 1/1990 | Bowers | 178/18 |
| 4,947,156 | 8/1990 | Sato et al. | 178/18 X |
| 5,031,225 | 7/1991 | Tachikawa et al. | 382/21 |
| 5,195,133 | 3/1993 | Kapp et al. | 380/9 |
| 5,199,068 | 3/1993 | Cox | 380/23 |

FOREIGN PATENT DOCUMENTS

| | | |
|---|---|---|
| 0339588 | 11/1989 | European Pat. Off. . |
| 0379336 | 7/1990 | European Pat. Off. . |
| 3540626C2 | 5/1986 | Germany . |
| 4-43420 | 2/1992 | Japan . |

*Primary Examiner*—Stephen Chin
*Assistant Examiner*—Kevin Kim
*Attorney, Agent, or Firm*—Finnegan, Henderson, Farabow, Garrett & Dunner

[57] ABSTRACT

The handwriting input device includes an integrated display input device formed by integrating a display device and a tablet for inputting coordinates one on the other. The integrated display input device is used to input coordinate data of a designated position to an input region displayed on the display device. In accordance with the input region containing coordinate data, handwritten characters, or the like are input to the handwriting input apparatus. The input region is shifted in an arbitrary direction by rotation and transfer in the screen of the display device. In the case where the input region is rotated.

11 Claims, 16 Drawing Sheets

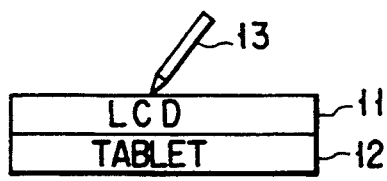
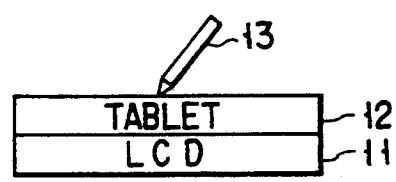
FIG. 3A  FIG. 3B
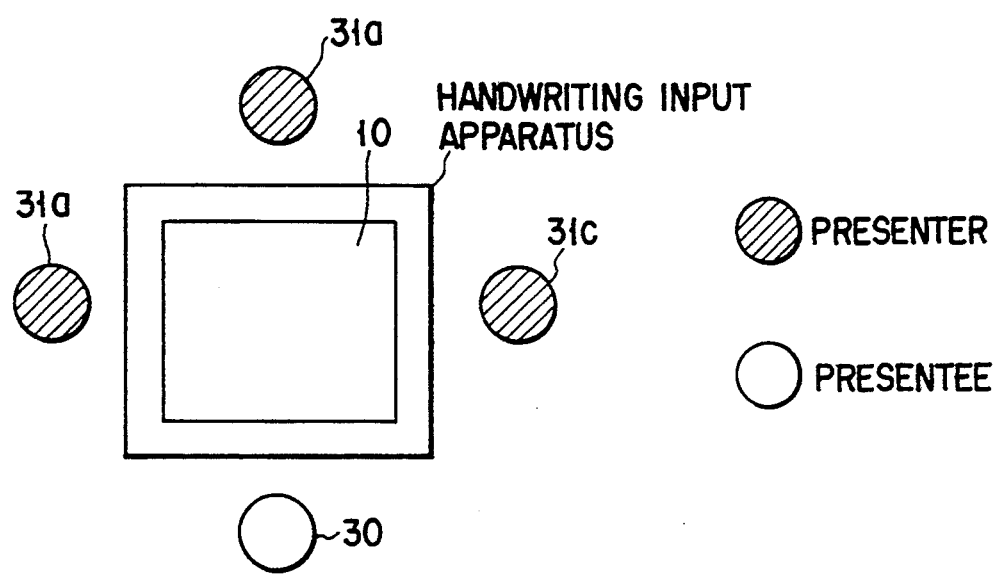
FIG. 4

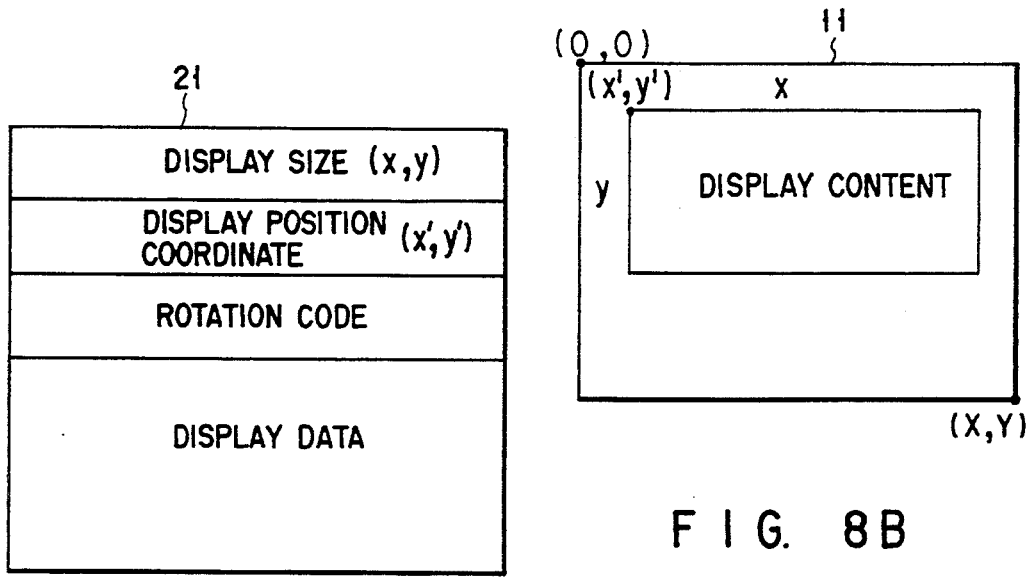
FIG. 8A
FIG. 8B
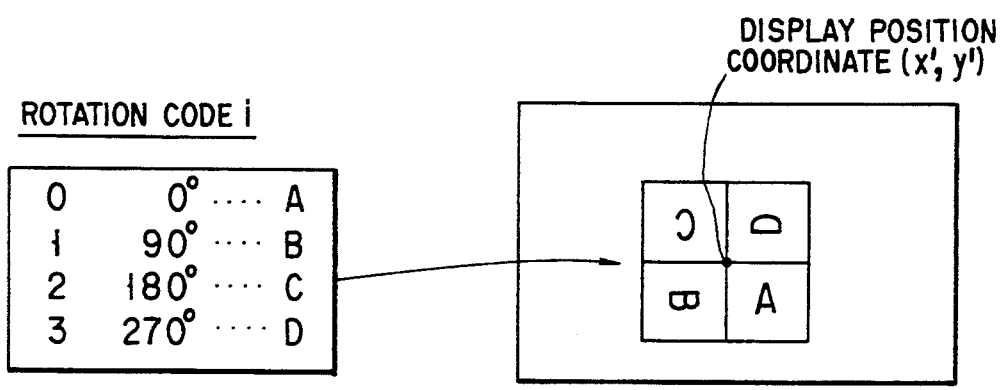
FIG. 10

FIG. 13

40:DISPLAY REGION
43:SOFTWARE KEYBOARD
45
46

NAME 東京太郎
POSTAL CODE －
ADDRESS
PHONE NUMBER
AGE 25
SEX MALE FEMALE 7 8 9 ÷ ×
4 5 6 − +
1 2 3 . =
0

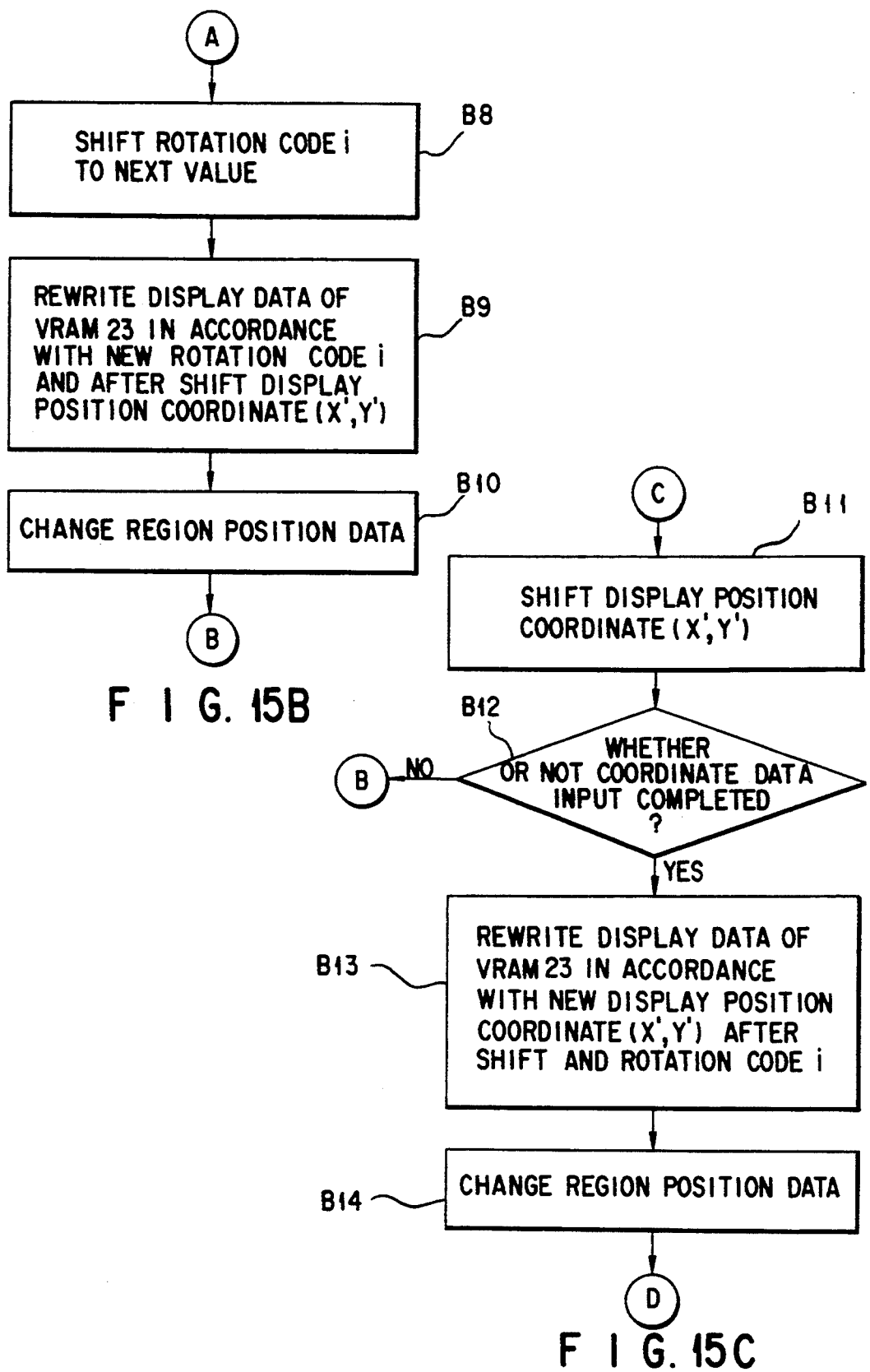

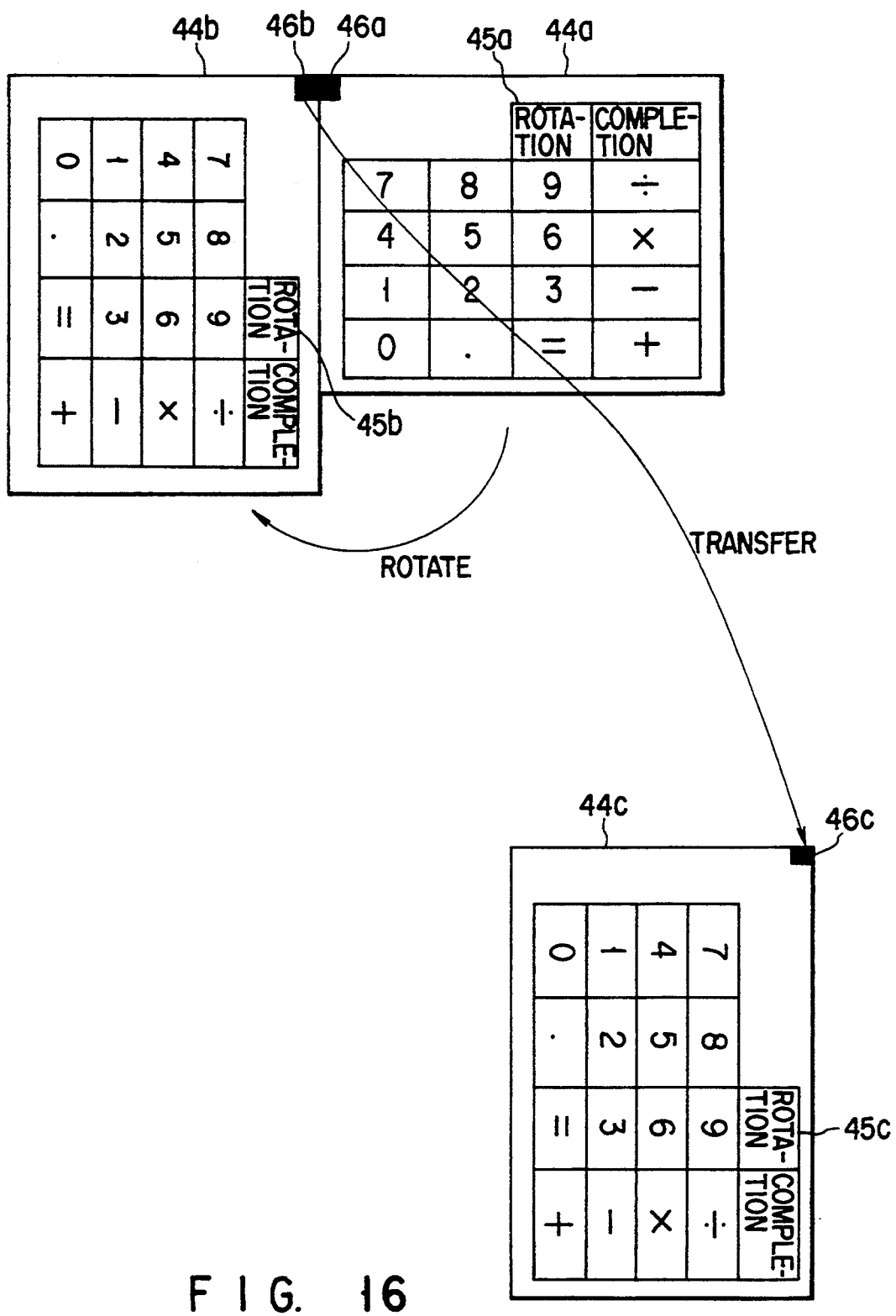
F I G. 16

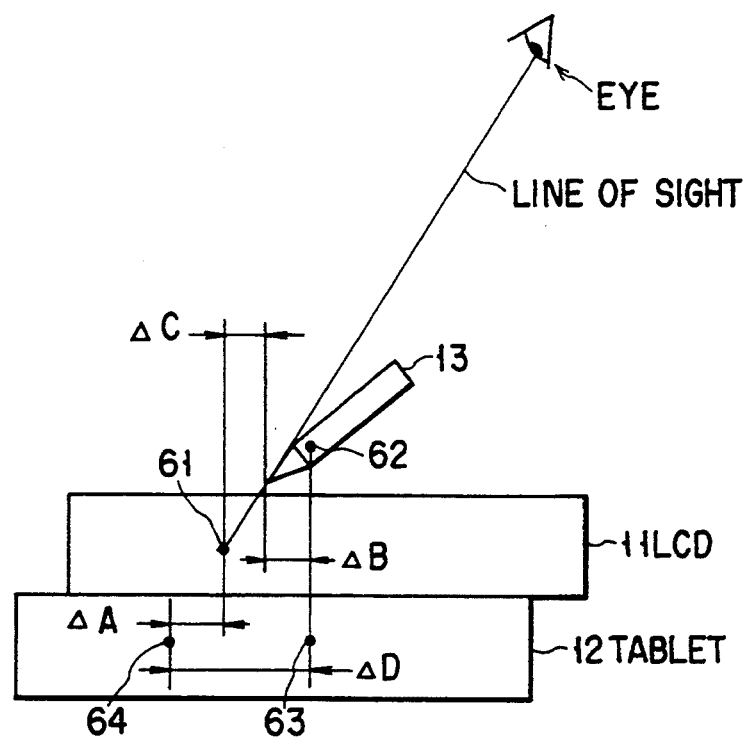
F I G. 17
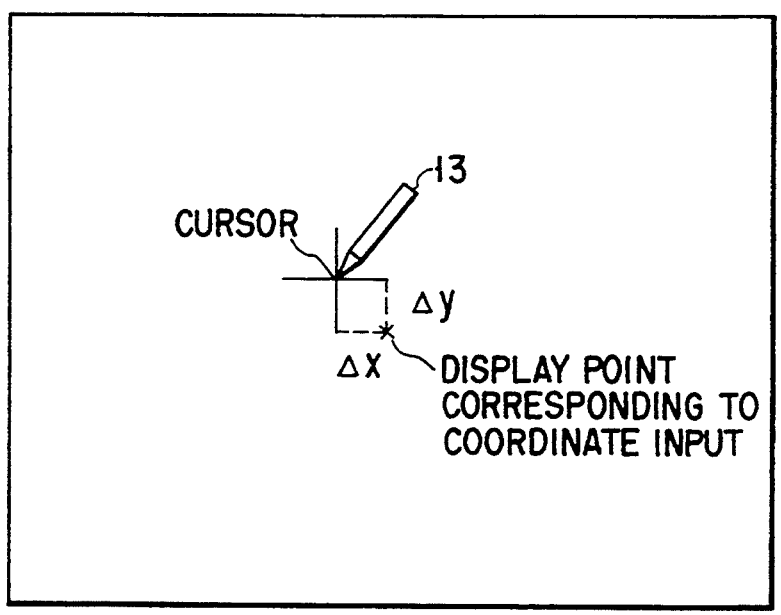
F I G. 18

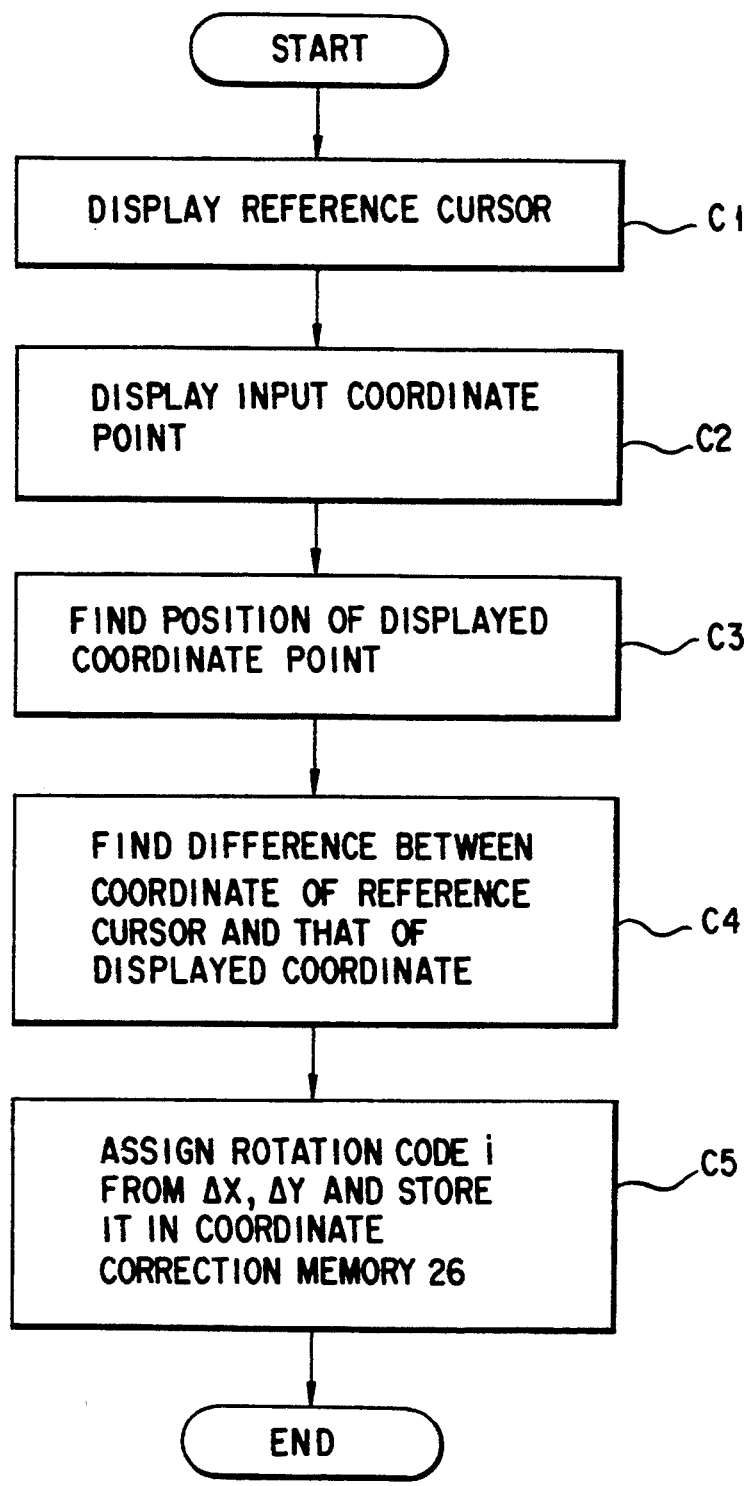
F I G. 19

HANDWRITING INPUT APPARATUS FOR INPUTTING HANDWRITTEN DATA FROM UNSPECIFIED DIRECTION

BACKGROUND OF THE INVENTION

1. Field of the Invention

The present invention relates to a handwriting input apparatus for inputting data such as characters via a tablet for inputting coordinate points.

2. Description of the Related Art

Recently, personal computers, or handy computer terminals are carried by many users, and used in negotiations of sales, or the like. Before the portable computers have been developed, a "paper" document sheet was presented to a customer, who filled out necessary items as in an application form, and the data of the items were manually input to a computer based on the data filled out on the paper sheet as observing the same document displayed on the screen of the computer.

In the meantime, much attention is paid to an handwriting input apparatus having a display input screen on which a plane-like display and a tablet for inputting coordinates are superimposed on each other, and data input is carried out by handwriting the data on the display input screen with a stylus pen, since such apparatus is regarded as a computer having an interface, easily operable by anyone as writing down characters on a sheet of paper.

In the case where a handwritten character is input, the handwriting input apparatus, first, indicates a region for inputting a handwritten data on the display screen, and the character is recognized based on the coordinate data arrangement (handwriting input pattern) input within the region.

In the field of business, such a handwriting input apparatus can help a customer who is not familiar with the operation of the computer to directly input data into the apparatus. However, the conventional type of such an apparatus have a low operability since the region for inputting handwritten characters is set in one fixed direction.

More specifically, when having a negotiation with a customer, the presenter and the customer in many times sit to face with each other. Since the conventional handwriting input apparatus has one fixed direction of data input, the apparatus must be turned around such that it faces the fixed direction in which data input can be performed, in accordance with the position of the operator, each time the operator changes from the presenter to the customer, and vice versa.

SUMMARY OF THE INVENTION

The present invention has been proposed in consideration of the above problem, and the purpose thereof is to provide a handwriting input apparatus by which handwritten data input can be easily carried out even when there are a number of people operating the apparatus.

According to the first aspect of the invention, there is provided a handwriting input apparatus comprising: integrated display input means having a display input surface, formed by integrating a display device and a coordinate detection device for detecting coordinate data with each other; pointing means for pointing an arbitrary position on the display input surface; region data storing means for storing display control data for displaying an input region defined by a particular processing function on the display device, and region position data for indicating a range in which coordinate data can be input in accordance with the input region; region display means for displaying the input region on the display device with reference to the display control data stored in the region data storing means; region judging means for judging whether or not the coordinate data is located in the input region by comparing the region data stored in the region data storing means and the coordinate data detected by the coordinate detection device; processing means for executing the particular processing function in accordance with the pointed input region when the region judging means judges the detected coordinate data to be located in the input region; and region renewing means for renewing the display control data of the input region and the region position data of the same stored in the storing means.

According to the second aspect of the invention, there is provided a handwriting input apparatus comprising: integrated display input means formed by integrating a display device and a tablet for inputting coordinates one on the other, and having a display input surface; region display means for displaying an input region for inputting coordinate data used for a particular process to the display device; input means for inputting predetermined data corresponding to the input region based on the coordinate data input from the integrated display input means when a section of the display input surface which corresponds to the input region displayed by the region display means is designated; rotation means for rotating the input region displayed on the region display means by a predetermined angle; setting means for setting a correction value for the coordinate data input from the integrated display inputting means each time the input region is rotated by the predetermined angle by the rotation means; and coordinate value correction means for correcting a value of the coordinate data input from the integrated display input means based on a correction value corresponding to the rotation angle of the input region set by the setting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 3A and 3B are diagrams showing possible structures of the integrated display input apparatus 10;

FIG. 4 is an explanatory diagram of how the handwriting input apparatus is used;

FIG. 8A is a diagram showing a data format of the data concerning display contents to be displayed on an LCD 11;

FIG. 8B is a diagram showing a screen display on the LCD 11 corresponding the data format shown in FIG. 8A;

FIG. 10 is a diagram designed for an explanation of rotation code i;

FIGS. 13 and 14 each show an example of a screen in which a software keyboard 43 of numeral keys is displayed;

FIGS. 15A, 15B, 15C are diagrams designed to describe methods of rotating and transferring the input region or the software keyboard;

FIG. 16 is a diagram showing an example of the software keyboard of numeral keys;

FIG. 17 is a diagram for an explanation of input errors created in the integrated display input apparatus 10;

FIG. 18 is a diagram for an explanation of a method of detecting the input errors;

FIG. 19 is a flowchart explaining the procedure of detecting the input errors.

DETAILED DESCRIPTION OF THE PREFERRED EMBODIMENTS

An embodiment of the present invention will now be described in detail with reference to accompanying drawings.

Figure 1:
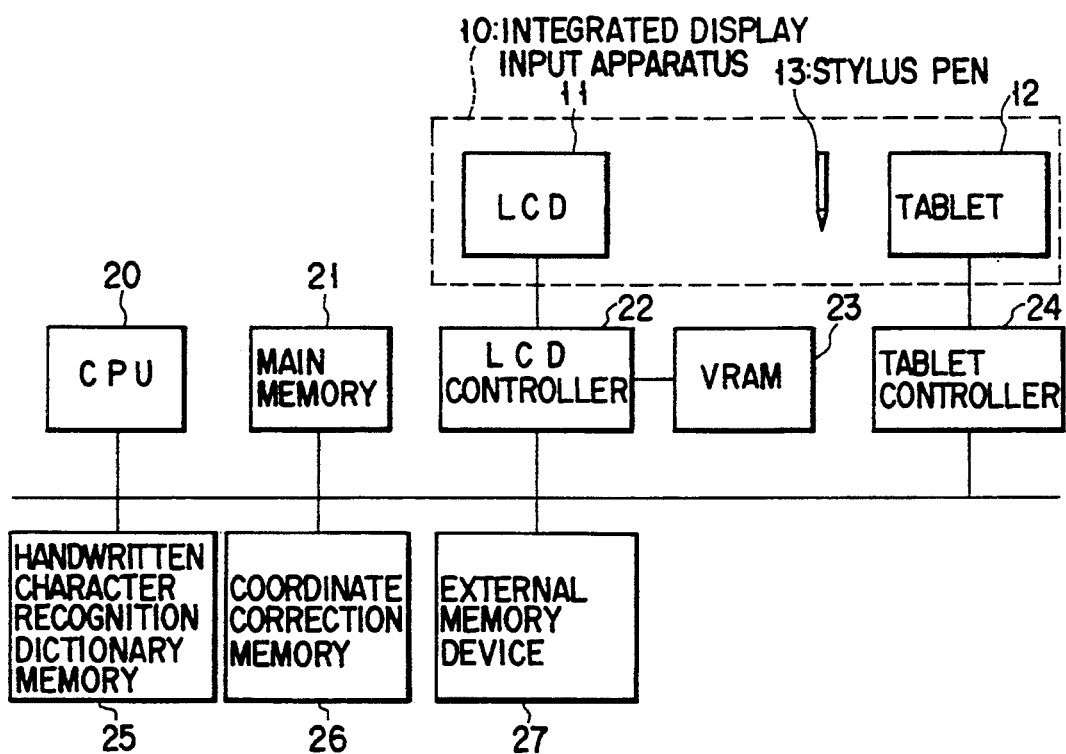
FIG. 1 is a block diagram showing the structure of a handwriting input apparatus according to the embodiment of the invention.

FIG. 1 is a block diagram showing the structure of a handwriting input apparatus according to an embodiment of the present invention. In FIG. 1, an integrated display input apparatus 10 is a display input device having an LCD 11, a plane display, and a tablet 12 for inputting coordinate points, which are placed one on the other so that display of data and input of coordinates can be conducted on the same screen. Coordinate data can be input by writing on the display input surface of the integrated display input apparatus 10 using a stylus pen 13.

A CPU 20 controls the overall operation of the writing input apparatus. A main memory 21 serves to store programs, data, and the like, handled by the CPU 20. More specifically, a control program for performing basic process of job management, data management, etc., a character recognition process program for performing handwritten character recognition process, a display data rotation program for converting display data stored in a VRAM 23 into display data obtained by rotating the stored data by an arbitrary angle in accordance with necessity, and error correction program for correcting an error of a coordinate input, are stored in the main memory 21. Further, content data including a display region displayed on the LCD 11, an input region, and a software keyboard are also stored in the main memory 21. The content data contains region position data by which it is judged whether or not an input coordinate is located within an input region (each of character input frames 41a) or within a key of the software keyboard. The region position data is coordinate data indicating the regional range of the character input frame 41a or the key.

An LCD controller 22 controls access from the CPU 20 to the VRAM 23, and transfer of display data from the VRAM 23 to the LCD 11. The VRAM 23 is designed for storing data displayed on the LCD 11.

A tablet controller 24 controls a tablet 12, or fetches coordinate data indicated by the stylus pen 13 on the tablet 12.

A handwritten character recognition dictionary memory 25 is designed to store dictionary data (dictionary pattern) for recognizing handwritten characters, figures, etc., input via the integrated display input apparatus 10. A coordinate correction memory 26 is designed for storing coordinate correction data for correcting assembly error created when placing the tablet 12 and the LCD 11 one on the other, inclination error made by variation of an inclination of the stylus pen 13 with respect to the surface of the tablet 12, and parallax error created between the display surface and the tip of the stylus pen 13 due to the position from which an image on the screen of the LCD 11 is observed.

An external memory device 27 is, for example, a hard disk device, or floppy disk device, and is designed for storing programs and data necessary for the handwriting input apparatus.

Figure 2:
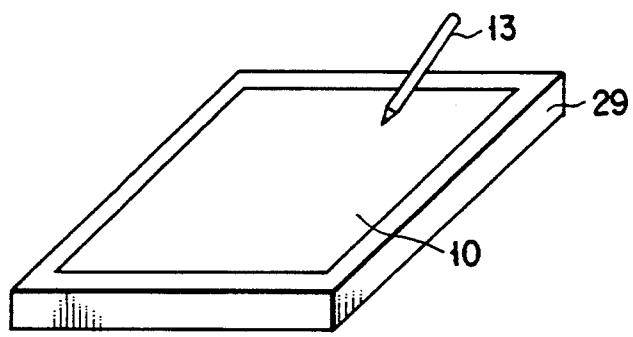
FIG. 2 is a schematic view showing an appearance of the handwriting input apparatus.

FIG. 2 is a schematic view showing the appearance of the handwriting input apparatus. A main body 29 has an upper surface section, in which the integrated display input device 10 is set such that the display input section thereof is exposed. With this structure, handwriting input can be conducted by use of the stylus pen 13. The main body 29 encloses the functional sections shown in FIG. 1.

FIGS. 3A and 3B are diagrams showing possible structures of the integrated display input apparatus 10. In accordance with the coordinate detection mode, the integrated display input apparatus 10 can have the structure shown in FIG. 3A, in which the tablet 12 is placed on the LCD 11, or the structure shown in FIG. 3B, in which the transparent tablet 12 is placed on the LCD 11. There are several types of coordinate detection modes, for example, the electromagnetic induction type, the electrostatic coupling type, and the pressure sensitive type.

The operation of the embodiment will now be described.

Figure 5:
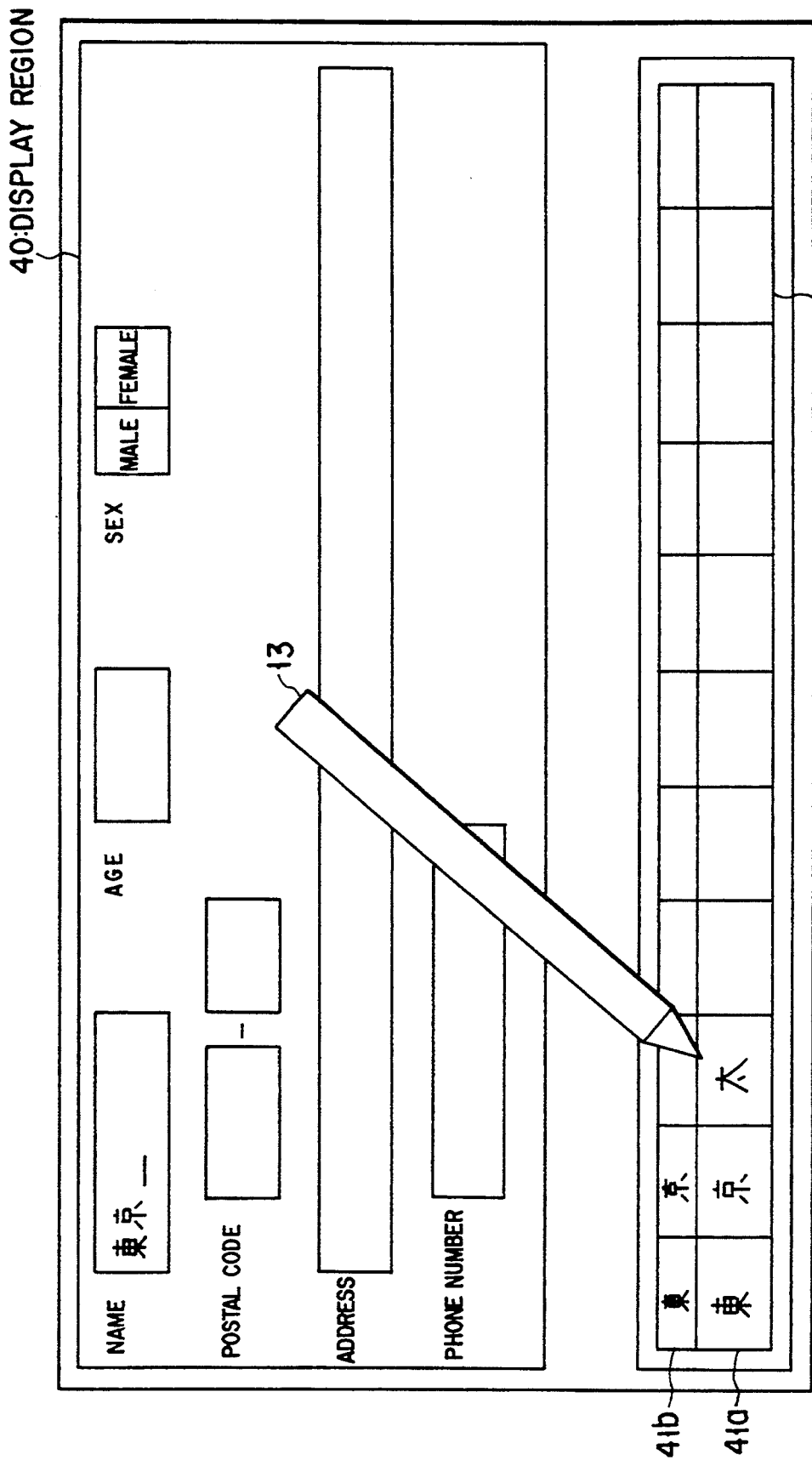
FIGS. 5, 6, and 7 each show an example of the screen display.
Figure 6:
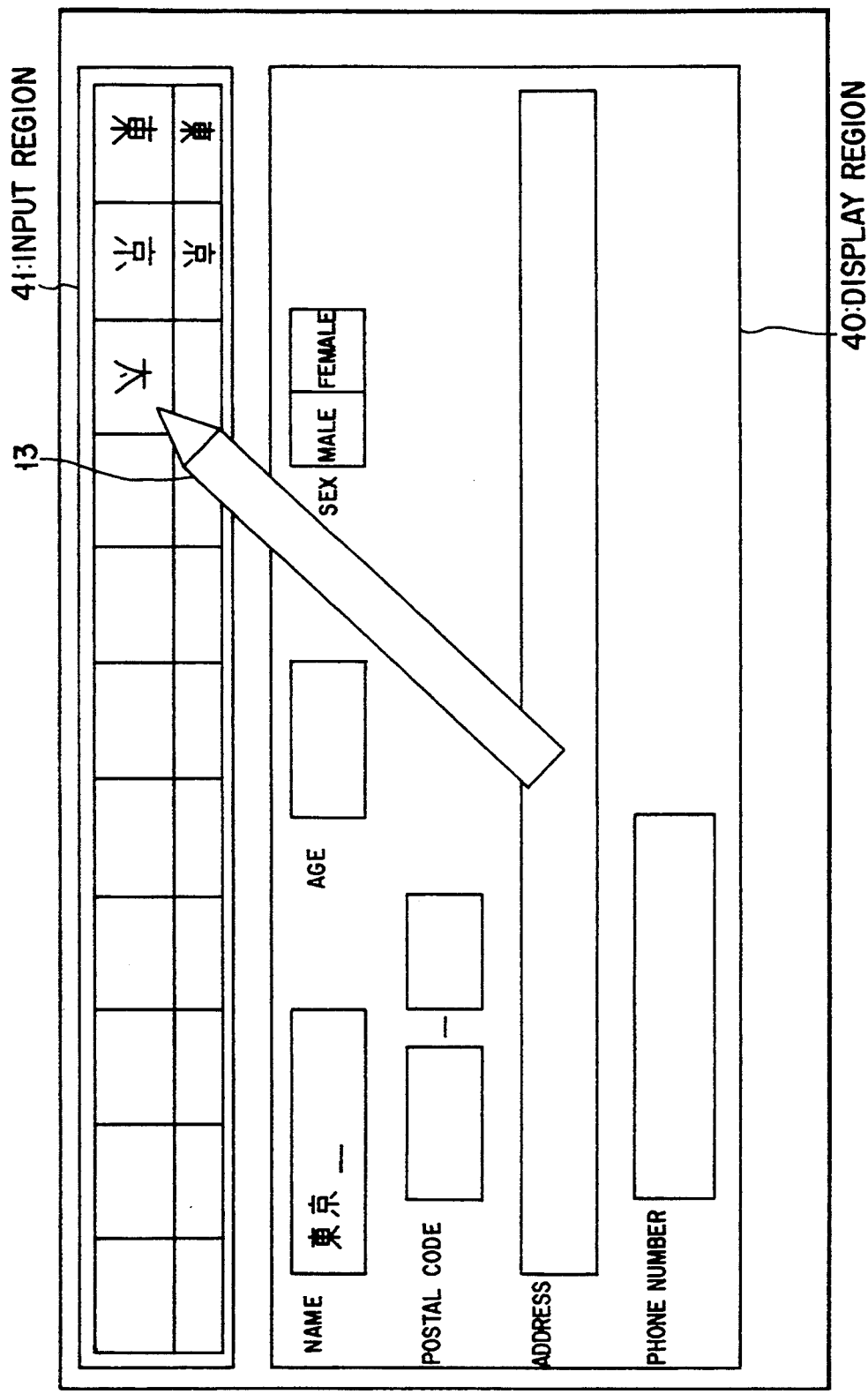
Figure 7:
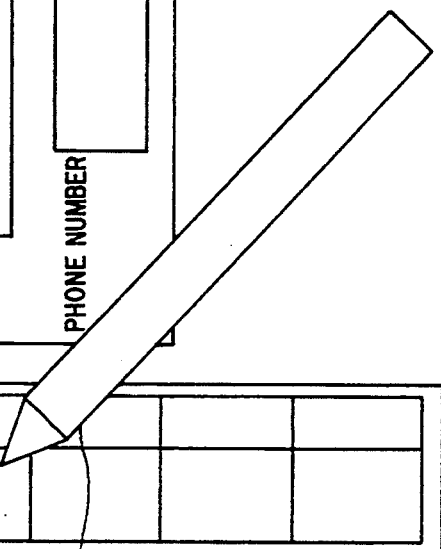

In the case where necessary handwritings are input to the apparatus while presenting data on the screen to a presentes, the handwriting input apparatus is used as shown in FIG. 4. Let us suppose, for example, that a presentee 30 sits in the front side of the handwriting input apparatus, and presenters 31a, 31b, and 31c sit in the other three sides of the apparatus. While maintaining the set positions, display of data and input of handwritings are carried out as follows:

FIGS. 5, 6, and 7 each show an example of a display on the LCD 11 having a display region 40 and an input region 41, to which character data are input to be read by the handwritten character recognition process.

In each of FIGS. 5, 6, and 7, the display region 40 is a region in which processed display data and input data are displayed. The display region 40 has sections for displaying the characters, etc. input in response to items such as name, age, sex, postal code, address, and phone number.

The input region 41 is a region for inputting data to be subjected to the handwritten character recognition. When necessary data in response to an item displayed on the display region 40 is handwritten (touch on the display input surface) using the stylus pen 13 in the input region 41, the data is recognized and displayed in a predetermined section on the display screen.

The input region 41 consists of a number of character input frames 41a in each of which a character is handwritten, and the same number of result display frames 41b each of which is located above each of the corresponding character input frames for displaying the result of character recognition of the handwritten character input to the corresponding input frame.

FIG. 5 shows an example of a display screen in the case where the handwriting input apparatus is used by only one operator (data is input only from the side of the presentee 30). In this case, the display region 40 and the input region 41 are displayed in the same direction (rotation angle of 0°).

When a character is handwritten within one of the character input frames 41a of the input region 41 with the stylus pen 13, the handwritten character is judged if it is a coordinate input to the input region 41 based on regional position data while displaying the handwriting in that one of the character input frames 41a, and the coordinate data series (handwriting input pattern) is subjected to the character recognition process.

The CPU 20 performs a character recognition process for the input coordinate data mode while referring to the dictionary patterns stored in the handwriting character recognition dictionary memory 25, in accordance with the character recognition process program stored in the main memory 21. The code data obtained from the character recognition is converted into character pattern data to be displayed. The character pattern data is stored in a predetermined location in the VRAM 23 via the LCD controller 22.

Thus, the character recognized by the CPU 20 is displayed in the result display frame 41b located on the character input frame 41a to which the handwriting was input. The character is also displayed in the region corresponding to an item to be subjected to data input, for example, FIG. 5 shows the case of item "Name".

In the meantime, FIG. 6 shows a display screen in the case where the presentee 30 sits to face the presenter 31b. In this case, the display region 40 is presented to face the presentee 30, and the input region 41 is displayed in the opposite direction (rotation angle of 180°) so that the presenter 31b can easily write in the input region from his/her position.

The following is a description of a mode change from the basic state shown in FIG. 5 to a display in which the input region 41 is turned upside down as shown in FIG. 6.

The data of display contents to be displayed on the LCD 11 is stored in the main memory 21 in a data format as shown in FIG. 8A, and consists of a display size in terms of length (x) and height (y), a display position coordinate (x', y') regarded as the origin (upper left corner) of display, a rotation code i indicating a rotation angle for displaying a character at an arbitrary angle, and display data concerning the contents to be actually displayed. Based on these data, the display contents are displayed on the LCD 11 as shown in FIG. 8B. In this embodiment, a rotation angle can be selected arbitrarily from four angles, 0°, 90°, 180° and 270°.

First, an instruction for execution of a display data rotation program is input to rotate a certain region of the display. The CPU 20 executes a display data rotation process in accordance with the display data rotation program. The procedure of the display data rotation process is described in the flowchart shown in FIG. 9.

Figure 9:
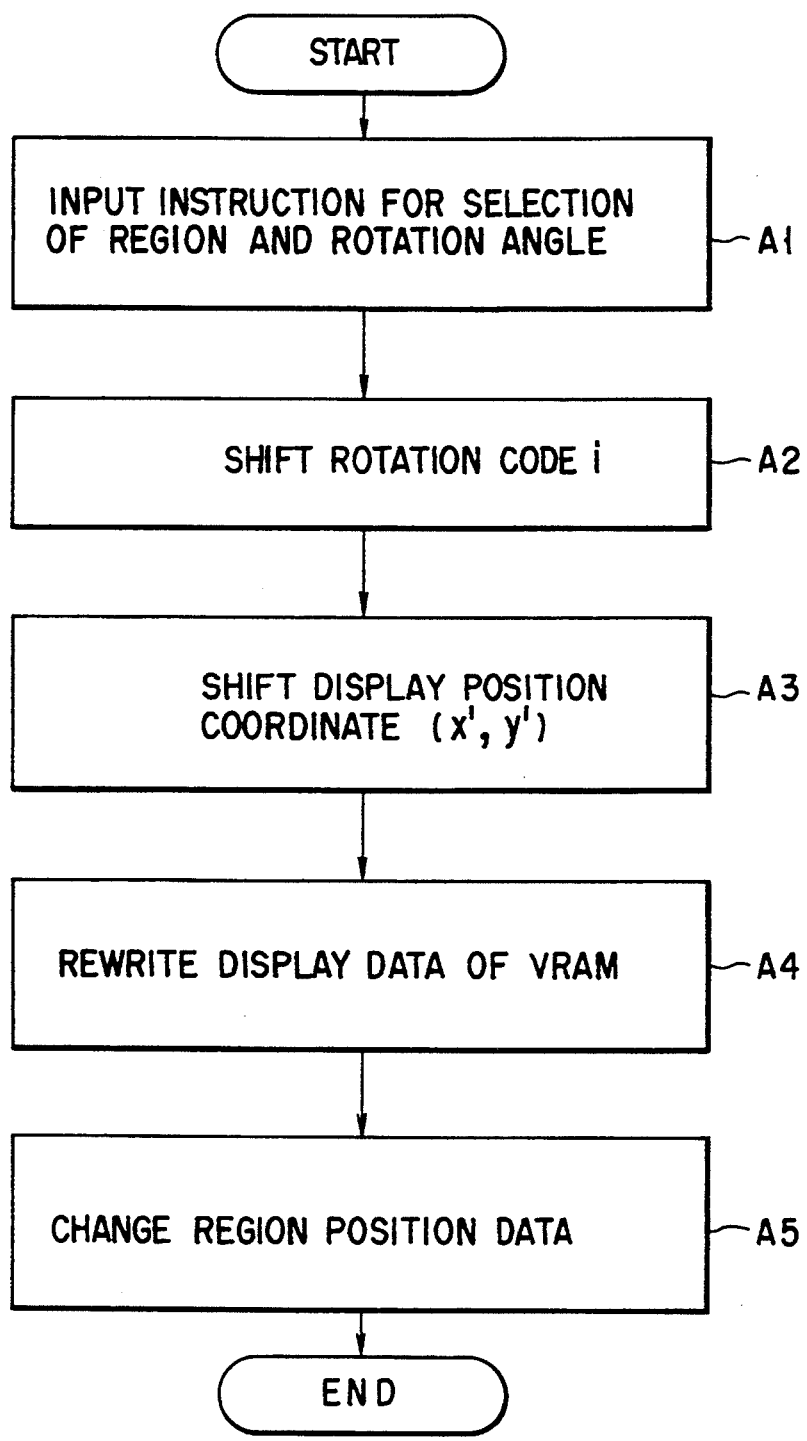
FIG. 9 is a flowchart showing the procedure of display data rotation process.

As can be seen in FIG. 9, selection of a region to be rotated, and a rotation angle is conducted (step A1). To select the region and angle, a menu is displayed on the screen, and they are selected arbitrarily from the menu. In accordance with the rotation angle selected, the CPU 20 changes the rotation code i (step A2).

The rotation code i has four alternatives as shown in FIG. 10. In the case of rotation code 0, the character "A" is rotated by 0°, in the case of rotation code 1, the character "B" is rotated by 90°, in the case of rotation code 2, the character "C" is rotated by 180° C., and in the case of rotation code 3, the character "D" is rotated by 270°.

When an instruction is input, the CPU 20 reads out the data to be displayed, from the main memory 11. Then, the CPU 20 finds the position for displaying the input region 41 which matches with the rotation code i in the display screen, based on the display position coordinate (x', y'), and shifts the display position coordinate (x', y') of each of the other display data (for example, display region 40) to be displayed in accordance with the display position of the input region 41 (step A3). The CPU 20 writes the display data into the VRAM 23 in accordance with the contents of the data format after shift (step A4).

In the case where the size of the input region 41 before the rotation does not fit the size of the display screen (when the rotation code i=1, or 3) and cannot be displayed on the screen, the display data is shaped to fit the display screen, and written in the VRAM 23. For example, when the input region 41 shown in FIG. 5 is rotated by 90°, all of the character input frames cannot be displayed; therefore the input frames the number of which corresponds to the width of the rotated display screen are displayed.

Handwriting of characters in the input region 41 can be more easily performed when the region is located on the operator's side; therefore when one of the four types of rotation is instructed, the display position of the input region 41 is shifted in accordance with the rotation angle, and the position of the display region 40 is shifted, accordingly.

The CPU 20 changes the value of region position data in accordance with the shift of the display position of the input region 41 (step A5), so that it can be judged whether or not a coordinate input in the after-shift input region 41 is located in an appropriate input region (each character input frame 41a).

Further, CPU 20 is able to execute a shift process for shifting the display position of the input region 41 to an arbitrary position. For example, once the shift process is selected from the menu, and the input region 41 to be shifted is specified, the CPU 20 shifts the input region 41 to an arbitrary position of the display screen, and this position can be set by the stylus pen 13.

As can be seen along with a software keyboard 43 (44a, 44b, and 44c) later described, there is provided a reference mark in the input region 41 for arbitrarily shifting the display position thereof. The display position of the input region 41 can be shifted by use of this reference mark. Shifting of the display position of the input region by use of a reference mark will be described later with reference to FIGS. 15A–15C, and 16.

An example of process for inputting data by the handwritten character recognition process in the case where the input region 41 is rotated as shown in FIGS. 6 and 7, will now be described.

As can be seen in FIG. 5, in the case of the rotation code 0 where the input region 41 is rotated by 0° (not rotated), the CPU 20 normalize the size of an input pattern handwritten in a character input frame 41a to that of the handwritten character recognition dictionary pattern stored in the handwritten character recognition dictionary memory 25.

Then, the CPU 20 set characterizing points (points in the pattern in FIG. 11) on the normalized handwritten input pattern, and these points are compared with the characterizing points of the dictionary pattern. Here, the sum of the distance of each of the corresponding characterizing point pairs is calculated, and the character having the smallest sum value is output as a result of recognition.

Figure 11:
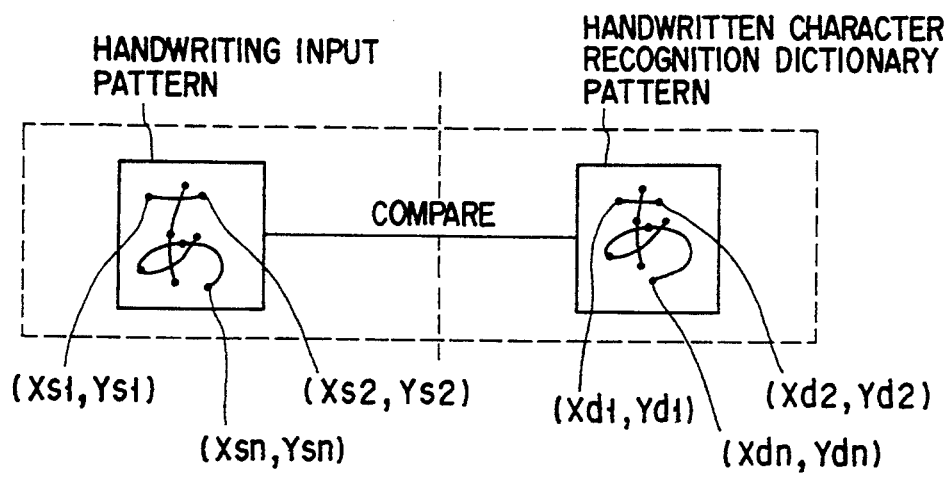
FIG. 11 is a diagram designed for an explanation of handwritten character recognition.
Figure 12:
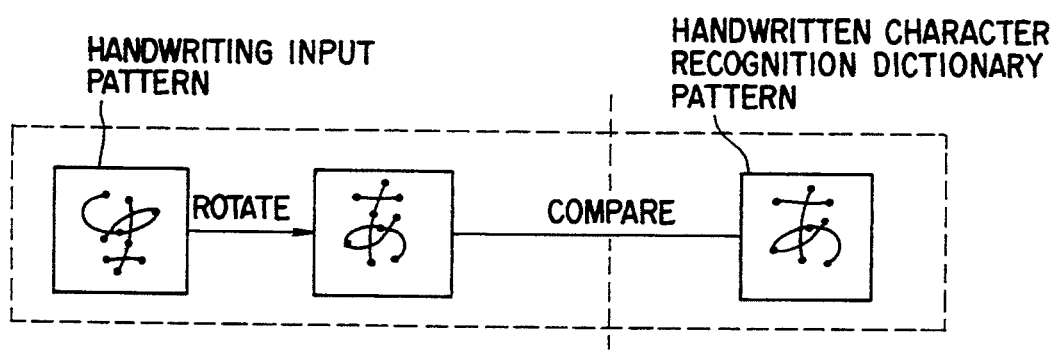
FIG. 12 is a diagram designed for an explanation of handwritten character recognition in the case where the input region 41 is rotated.

More specifically, identification between a handwritten input pattern and a handwritten character recognition dictionary pattern is carried out by comparing the coordinates of each corresponding characterizing point pair set on the strokes of a character. The sum of the distance between each of the corresponding characterizing point pairs is obtained from the following equation.

$$\Delta d = \sum_{i=1}^{n} \sqrt{(XSi - Xdi)^2 + (YSi - Ydi)^2} \qquad (1)$$

where d: the sum of distances between the characterizing points on an input pattern and the corresponding ones on an dictionary pattern, (XSi, YSi): the coordinate of a characterizing point on an input pattern (Xdi, Ydi): the coordinate of a characterizing point on a dictionary pattern FIG. 11 shows an example in which an input pattern and a dictionary pattern are the same character; however, the comparison is carried out for all the characters stored in the dictionary. The handwritten character recognition usually consists of two steps, the first one is comparison between an input and a stored data in terms of the number of strokes (the number of line or curve segments constituting a character), and the second one is comparison between the input pattern and dictionary patterns having the same number of strokes as the input pattern in terms of coordinates of characteristic points.

In the case of the rotation code 2 shown in FIG. 6 where the input region 41 is rotated by 180°, the CPU 20 rotates the input pattern handwritten in each character input frame 41a by 180°, and then normalize the input pattern.

Then, in the same manner as described in connection with the case of the rotation code 0, the CPU 20 set characterizing points on the normalized handwritten input pattern, and these points are compared with the characterizing points of the dictionary pattern so as to calculate the sum of the distance of each of the corresponding characterizing point pairs, thereby outputting the character having the smallest sum value as a result of recognition. It should be noted that the handwritten input pattern is rotated in accordance with rotation of the input region 41 in this embodiment, but it may be vice versa, and the dictionary pattern may be rotated to carry out the comparison of characterizing points.

The input mode using a software keyboard will now be described.

The software keyboard is a keyboard image displayed on the LCD 11. When a key of the software keyboard is touched by the stylus pen 13 for instruction, the CPU 20 identifies the data to be input from the key touched, and inputs the data.

Figure 14:
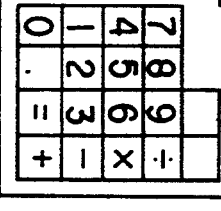

FIGS. 13 and 14 each show an example of a screen on which a software keyboard 43 is displayed. The software keyboard 43 is for inputting numerals. The software keyboard 43 includes a rotation key 45 for rotating the display of the software keyboard 43 itself, and a reference mark 46 for arbitrarily shifting the display position, other than numeral keys. Transfer and rotation of the software keyboard 43 will be described later.

FIG. 13 is a diagram of a display showing the software keyboard 43 set in the same direction as the display region 40 (rotation angle of 0°), used in the case where data is input through the keyboard 43 from the presentee side.

The display data for displaying the software keyboard 43 is stored in a format similar to that shown in FIG. 8A. When an instruction of rotation is given, the CPU 20 inputs the display data to the VRAM 23 based on the display size (x, y), the display position coordinate (x', y'), and the rotation code i of the software keyboard 43 so as to shift the display position. Further, the CPU 20 changes the region position data concerning the software keyboard 43.

The methods of rotating and transferring the input region and software keyboard will now be described in detail with reference to FIGS. 15A, 15B, and 15C. FIG. 16 is a diagram showing an example of a software keyboard for inputting numerals. Such a software keyboard is used to input data for the item of, for example, "age" as shown in FIG. 13.

The CPU 20 displays the software keyboard at a predetermined position when the input region of the item "age" is tapped with the stylus pen 13 so as to input the coordinate data of this region to the CPU 20. The CPU 20 displays a software keyboard 44a, for example, as shown in FIG. 16 based on the display position coordinate (x', y') and the rotation code i in the data format shown in FIG. 8A.

The software keyboard 44a shown in FIG. 16 includes a rotation key 45a for inputting an instruction of rotation, and a reference mark 46b serving as the reference point when the image of the keyboard is transferred.

To change the direction of the software keyboard 44a, the rotation key 45a of the software keyboard 44a is tapped with the stylus pen 13 (steps B1 and B3). The CPU 20 receives the instruction of rotation in the form of coordinate data, and renews the rotation code i to the next value (rotation code i takes the looping order of 0→1→2→3→0→) (step B8). For example, in the case where the previous rotation code of the software keyboard 44a is "0", the CPU 20 renews the code to "1". The CPU 20 rewrites the display data of the VRAM 23 in accordance with the new rotation code 1 and the display position coordinate (x', y') (step B9), and the software keyboard 44b rotated by 90° from the previous position is displayed. The CPU 20 changes the region position date in accordance with the rotated software keyboard 44b (step B10).

When the rotation key 45b of the software keyboard 44b is tapped once with the stylus pen 13, the CPU 20 shifts the display direction of the software keyboard 44b by 90°.

In the meantime, to transfer the display position of the software keyboard 44b to some other position, the reference mark 46b of the software keyboard 44b is pressed with the stylus pen 13, and the tip of the stylus pen 13 is moved to the new display position while the pen pressing the surface of the display (steps B1, B2, and B12). The CPU 20 shifts the display position coordinate (x', y') to the position instructed by the stylus pen 13 (step B11). When the stylus pen 13 is detached from the display input surface of the integrated display input apparatus 10, the position to where the software keyboard 44b will be transferred is determined (step B12). The CPU 20 rewrites the display data in the VRAM 23 in accordance with the new display position coordinate (x', y') and rotation code i (step B13), and display the software keyboard 44c at the new position. The CPU 20 changes the region position data in accordance with the transferred software keyboard 44c (step B14).

Figure 15A:
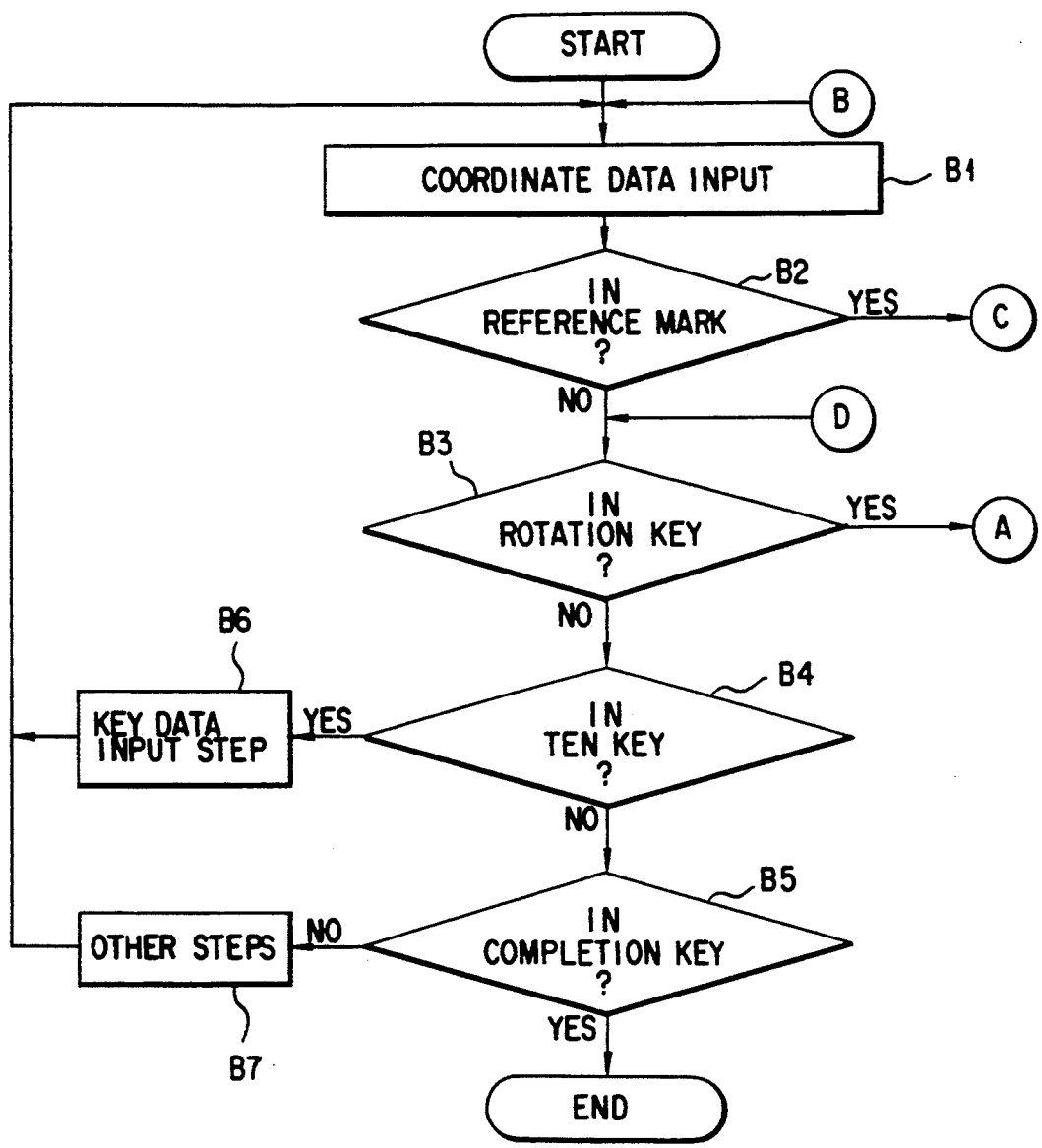

According the flowcharts shown in FIGS. 15A, 15B, and 15C, the software keyboard is displayed to the new position after determining the new coordinate position. However, it is also possible to display the software keyboard all the way through the new position while tracing the stylus pen 13.

In the case where the input region for inputting handwritten characters is to be transferred, the range of the input region can be arbitrarily set after determining the new position. For example, after the new position to where the input region is to be transferred (the position of the reference mark) is determined, coordinate data for indicating the range of the input region is input to the apparatus. The CPU 20 determines the range of the input region from the coordinate data input. More specifically, the CPU 20 selects either x coordinate value or y coordinate value of the coordinate data in accordance with the rotation code i. For example, in the case where the rotation code i is "0" or "2", the CPU 20 selects the x coordinate value which indicates the range of the input region for horizontal writing, whereas in the case where the rotation code i is "1" or "3", the y coordinate value is selected for vertical writing. The CPU 20 calculates the number of input frames which can be displayed between the selected coordinate value and the reference mark, and displays an input region consisting of that number of input frames.

Accordingly, the contents of the data format shown in FIG. 8 are also renewed in accordance with the rotation of the software keyboard displayed, or the new display position thereof.

It should be noted that the software keyboard is not limited to the type for inputting numerals as shown in FIGS. 13, 14, and 16, but may be the type for inputting characters including alphabet and kana (Japanese characters).

A correction process for correcting coordinate errors created in the integrated display input apparatus 10 will now be described.

In this embodiment, the value of input coordinate data is corrected in accordance with the position of the operator actually inputting a handwriting, of the presenters 31a, 31b, and 31c and the presentee 30 as shown in FIG. 4.

In the integrated display input apparatus 10, a various types of errors can occur between the display position displayed on the LCD 11 and the coordinate position input from the tablet 12 as shown in FIG. 17, which shows the case where the LCD 11 is placed on the tablet 12 as shown in FIG. 3A.

In FIG. 17, $\Delta A$ is an assembly error created while combining the LCD 11 and the tablet 12 with each other, $\Delta B$ is an inclination error which may vary depending on how the stylus pen 13 is held in the hand, and $\Delta C$ is a parallax error which may vary depending on the position of eye.

More specifically, let us suppose that the coordinate position 63 of the detection position 62 of the stylus pen 13 is, actually, detected by the tablet 12, despite that the coordinate point 61 displayed on the LCD 11 is really supposed to be pointed by the stylus pen 13. In this case, the error between the coordinate point 61 and the input coordinate position 63 is the sum of the gap between the coordinate point 61 and the tip of the pen (parallax error $\Delta C$), and the gap between the tip of the pen and the surface of the tablet 12 of the detection portion 62 due to inclination of the stylus pen 13 when used. Further, even if the parallax error $\Delta C$ and the inclination error $\Delta B$ are avoided, there still be a gap between the coordinates 61 and 64 (assembly error $\Delta A$). Consequently, all the errors sums up to $\Delta D$.

The overall error is calculated as can be seen FIG. 18 for each case of various directions of inputting a handwriting, and various conditions of handwriting (the position of eye, how the stylus pen 23 is held, etc.). FIG. 19 shows the flow chart describing the procedure for calculating the error.

Figure 20:
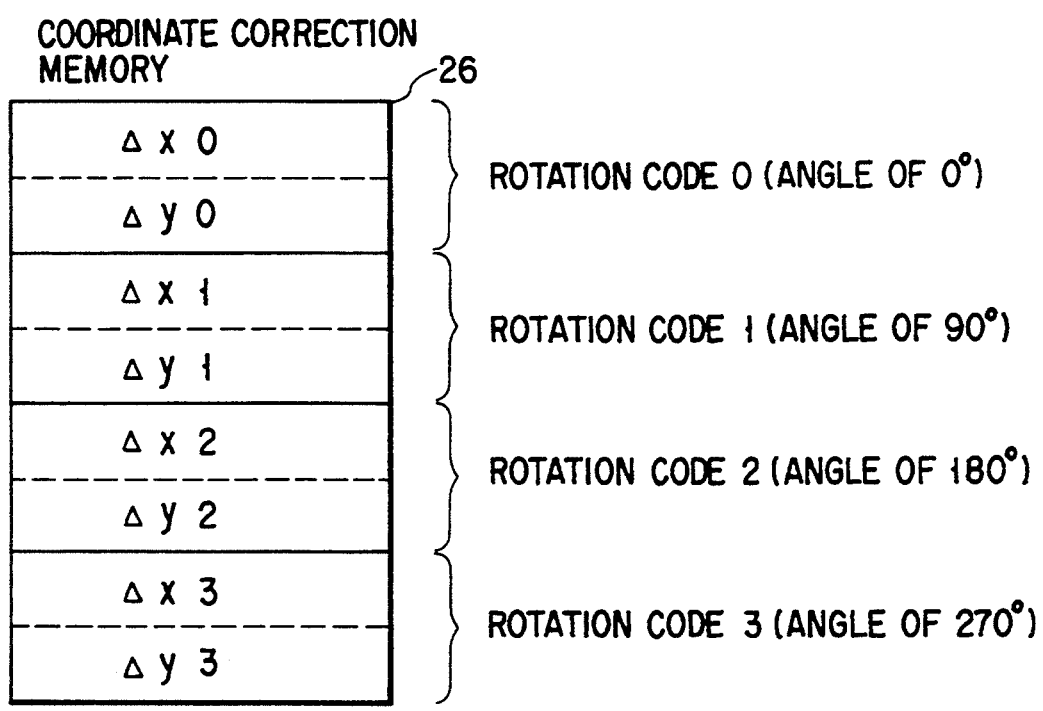
FIG. 20 is a diagram showing the contents of a coordinate correction memory 26.

The CPU 20 displays a cursor serving as a reference point on the LCD 11 such that the reference point can be designated by the stylus pen 13 (step C1). When a reference point is specified, the CPU 20 displays a point which corresponds to the coordinate data pointed by the stylus pen 23, on the LCD 11 (step C2). Then, the CPU 20 find the coordinate position of the point displayed in correspondence to the coordinate data input. Further, the distance between the displayed coordinate point and the cursor position as the reference point is calculated in terms of x and y components (step C4). As is known from above, the gap between a theoretical coordinate which is supposed to be pointed and that actually input is regarded as an error. The x and y components of the error are here defined as $\Delta x$, and $\Delta y$. The CPU 20 rearranges $\Delta x$, and $\Delta y$ in accordance with a rotation code i to have a coordinate correction value ($\Delta xi$, and $\Delta yi$), as shown in FIG. 20, and which will be stored in a coordinate correction memory 26 (step C5).

Such an operation is performed for each of the handwriting input directions (0°, 90°, 180°, and 270°) of the handwriting input apparatus, and therefore a coordinate correction value ($\Delta xi$, and $\Delta yi$) can be obtained for each of the angles for rotating the input region.

In the case where a handwriting is input to the input region 41, the CPU 20 reads out the coordinate correction value ($\Delta xi$, and $\Delta yi$) corresponding to the specified rotation code i for the input region from the coordinate correction memory 26, and corrects the value of the input coordinate data based on the coordinate correction value.

More specifically, a coordinate after correction can be expressed in the following equation.

$$(Xa, Ya) = ((Xt + \Delta Xi), (Yt + \Delta Yi)) \ldots \quad (2)$$

where (Xa, Ya) : coordinate after correction (Xt, Yt) : coordinate detected by tablet (ΔXi, and ΔYi) : coordinate correction value by each of rotation angles (i=0−3). The rotation angles are obtained from the rotation code i shown in FIG. 8.

Thus, the input coordinate is corrected in accordance with the direction of handwriting input, and therefore a handwriting input using the stylus pen 13 can be accurately displayed, and a key specified from the software keyboard can be accurately designated.

As described, the input region 41 can be rotated by an arbitrary angle (in this embodiment, any one of 0°, 90°, 180°, and 270°). Consequently, while fixing placement of the handwriting input apparatus, a handwriting can be performed easily and accurately from any direction.

Therefore, in the case where the handwriting input apparatus is placed as it is surrounded by a customer (presentee 30), and presenters (presenters 31a, 31b, and 31c) from a number of directions in a sales negotiation, data input can be performed easily from anyone of them, exhibiting a higher operability than conventional techniques.

More specifically, conventionally, a customer writes down necessary data on a sheet of paper, e.g. application form, and an operator must input the data into the apparatus as the operator reads the form. However, with the present invention, the customer can directly input the data into the apparatus, which is capable of data input by handwriting, and therefore the efficiency of work is higher.

It should be noted that the rotation angles of the input region 41 and others are set to four types, 0°, 90°, 180°, and 270°, but are not limited to these, and can be arbitrarily set.

Further, the displays shown in FIGS. 5, 6, 13, 14, and 16 are just examples, and the format of a display screen for inputting data can be arbitrarily set.

Moreover, in the embodiment, the position of the display region 40 is shifted along with the shift of the input region 41, but the position of the display region 40 may be fixed such that the input region 41 and display region 40 may be displayed overlapping with each other. However, in this case, the display data of the section of the display region 40 which overlaps with the input region 41 must be maintained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A handwriting input apparatus comprising:
   an integrated display input device having a display device and a coordinate detection device for detecting coordinate data, said display device and said coordinate detection device being arranged on one another and forming one unit;
   region data storing means for storing data concerning a display region and an input region, said display region having a plurality of sections corresponding to items to be input, and said input region defining a function of inputting data to said sections;
   region display means for displaying said display region and said input region on said display device in accordance with the data stored in said region data storing means, a display position in which said input region is defined being represented by display position coordinate data;
   section selecting means for selecting one of the sections of said display region displayed by said region display means;
   rotation angle setting means for setting a rotation angle indicating a display direction in which said input region, corresponding to the section selected by said section selecting means, is displayed by said region display means;
   transfer position setting means for setting a transfer position to which said input region, displayed by said region display means and corresponding to the section selected by said section selecting means, is transferred; and
   region renewing means for renewing the display position coordinate data representing the display position of said input region corresponding to the section selected by said section selecting means, in accordance with the rotation angle set by said rotation angle setting means and the transfer position set by said transfer position setting means, and for changing the display position and display direction of said input region, with a display state of said display region being maintained.

2. A handwriting input apparatus according to claim 1, further comprising:
   coordinate correction means for correcting a coordinate error between coordinate data input to said input region and coordinate data detected by said coordinate detection device in accordance with the rotation angle of said input region when said input region is rotated by said region data renewing means.

3. A handwriting input apparatus according to claim 1, wherein said input region is defined in accordance with a display size for indicating a range of the input region to be displayed on said display device stored in said region data storing means, said display position coordinate data indicating a reference position of the input region displayed on said display device, a rotation code for indicating a rotation state of said input region, and display control data including display data indicating a display content of said input region.

4. A handwriting input apparatus according to claim 3, wherein said region data renewing means comprises rotation renewing means for renewing said rotation code stored in said region data storing means and renewing said region position data in accordance with the rotation angle set by said rotation angle setting means.

5. A handwriting input apparatus according to claim 3, wherein said region data renewing means comprises:
   range renewing means for renewing the display size indicating the range of said input region; and
   display size renewing means for renewing said region position data in accordance with the display size renewed by said range renewing means.

6. A handwriting input apparatus according to claim 1, further comprising:
   characteristic extracting means for extracting a characterizing pattern from a coordinate data format input in a predetermined position of said input region;
   a character recognition dictionary for storing characterizing patterns for character recognition; and
   character recognition means for identifying a character by comparing said characterizing pattern extracted and the characterizing patterns in said character recognition dictionary with each other.

7. A handwriting input apparatus according to claim 1, further comprising:
  angle changing means for changing an angle of coordinate data format input in the input region in accordance with the rotation angle set by said rotation angle setting means;
  characteristic extracting means for extracting a characterizing pattern from the coordinate data format changed by said angle changing means;
  a character recognition dictionary in which characterizing patterns for character recognition are stored; and
  character recognition means for identifying a character by comparing said characterizing pattern input and the characterizing patterns in said character recognition dictionary with each other.

8. A handwriting input apparatus according to claim 1, further comprising character code generating means for generating code data consisting of a character or character sequence in accordance with the coordinate data input to a predetermined position of said input region.

9. A handwriting input apparatus according to claim 1, further comprising function generating means for generating data for executing a particular function in accordance with the coordinate data input to the predetermined position of said input region.

10. A handwriting input apparatus according to claim 1, wherein said region display means displays the input region including a rotation region and a reference region, and said region renewing means comprises:
  means for rotating said input region by a predetermined angle around a predetermined coordinate when coordinate data in the rotation region is input; and
  means for moving a position of said input region while showing the movement all the way through to a new position, as coordinate data in said reference region are continuously input.

11. A handwriting input apparatus according to claim 2, wherein said coordinate correction means includes:
  reference cursor display means for displaying a reference cursor indicating a reference point in a display image of said display device;
  calculating means for calculating a difference between theoretical coordinate data in accordance with said reference cursor and coordinate data accurately input; and
  correction value memory means for storing the difference calculated by said calculating means as a correction value.

* * * * *